H. DUMARS.
PROCESS OF PRODUCING OZONE AND SEPARATING GASES.
APPLICATION FILED FEB. 28, 1912.

1,074,106.

Patented Sept. 30, 1913.
2 SHEETS—SHEET 1.

H. DUMARS.
PROCESS OF PRODUCING OZONE AND SEPARATING GASES.
APPLICATION FILED FEB. 28, 1912.

1,074,106.

Patented Sept. 30, 1913.

UNITED STATES PATENT OFFICE.

HORACE DUMARS, OF GLEN RIDGE, NEW JERSEY.

PROCESS OF PRODUCING OZONE AND SEPARATING GASES.

1,074,106.  Specification of Letters Patent.  Patented Sept. 30, 1913.

Application filed February 28, 1912. Serial No. 680,476.

*To all whom it may concern:*

Be it known that I, HORACE DUMARS, a citizen of the United States, and a resident of Glen Ridge, in the county of Essex and State of New Jersey, have invented certain new and useful Improvements in Processes of Producing Ozone and Separating Gases, of which the following is a specification.

The invention relates to the production of ozone, and in certain aspects thereof more especially to the production of ozone in liquid form from the atmosphere.

The invention relates also to the separation of the atmospheric gases from each other.

The objects of the invention will in part be set forth hereinafter and will in part be obvious herefrom to those skilled in the art without setting forth in detail.

The invention consists in the novel improvements, steps, and processes, herein shown and described.

The accompanying drawings, referred to herein and forming a part hereof, illustrate one manner of carrying out the process of the invention, and apparatus or instrumentalities which may be used in carrying out said process.

Figure 1:
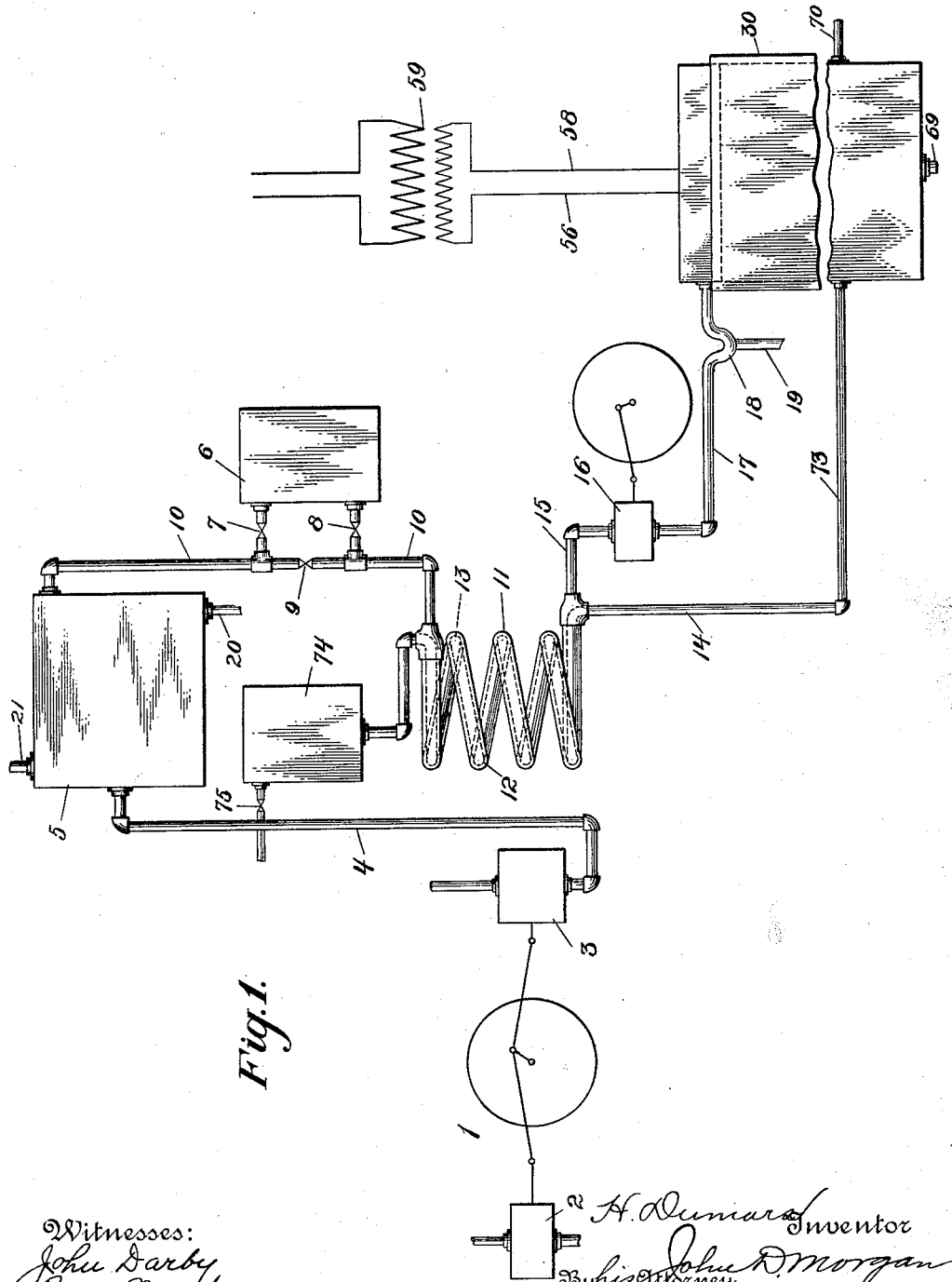
Figure 2:
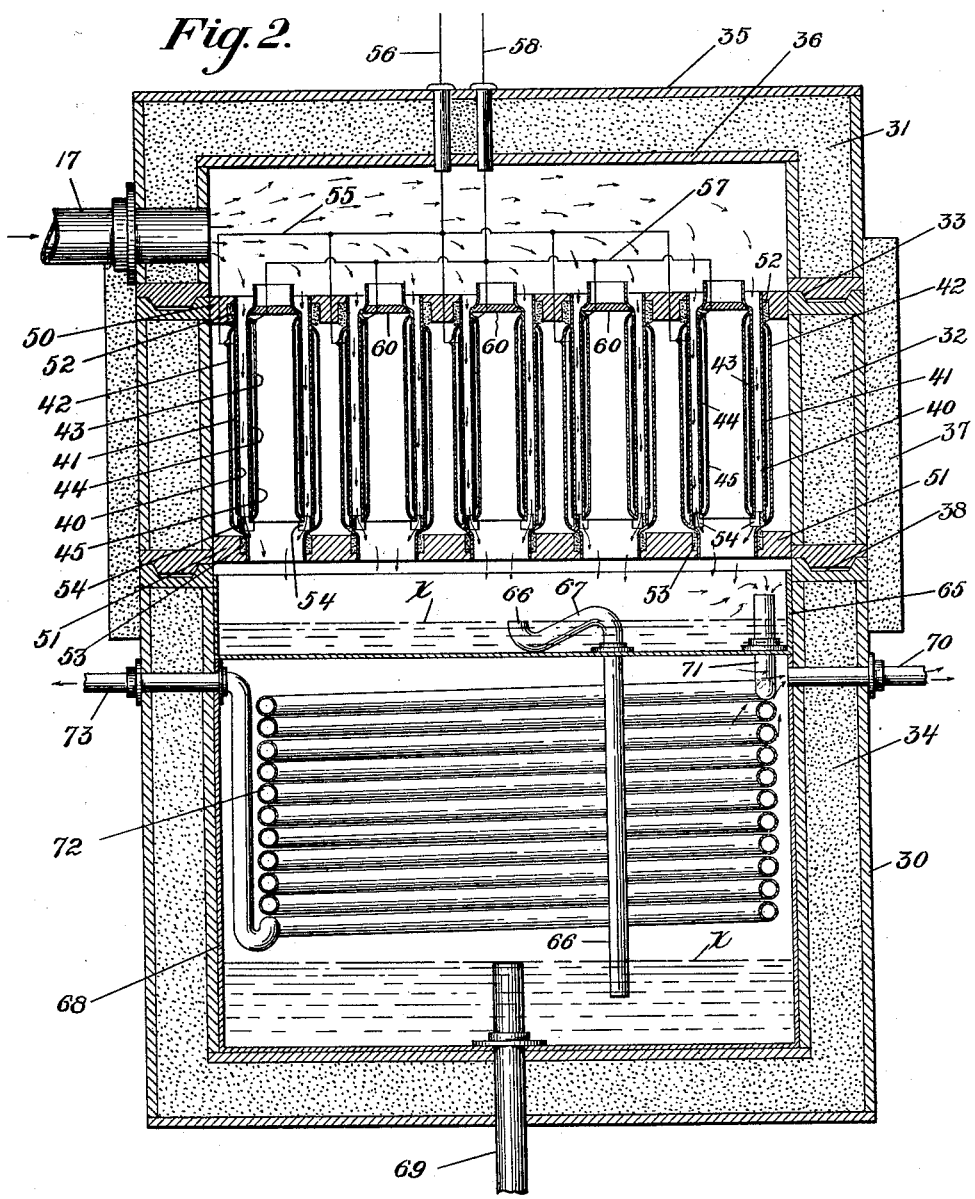

Of the drawings:—Figure 1 is an elevation, largely diagrammatic in character, of an apparatus for practising the invention; and Fig. 2 is a sectional view, on an enlarged scale, of what may be termed for convenience the ozonizer proper or separator (shown in fragmentary elevation at the lower right hand corner of Fig. 1).

In carrying out my invention I reduce air to a temperature lower than that at which ozone liquefies, and at such temperature I change the oxygen of the air into ozone, and owing to the fact that the temperature is below the liquefying temperature of ozone at the pressure prevailing, the ozone at once changes to the liquid state as soon as it is produced. I preferably produce the ozone at ordinary atmospheric pressure, the temperature being maintained at a point below the liquefying point (that is, the temperature at which it changes from gaseous to liquid form) for the ozone but above the liquefying point for either oxygen or nitrogen. The liquefying temperature, or point of liquefaction of ozone at atmospheric pressure is approximately 106° C. minus, while oxygen liquefies at approximately 179° C. minus, and nitrogen liquefies at approximately 196° C. minus.

Describing my invention further, and in such description referring to the illustrated apparatus, and pointing out the various parts thereof by suitable reference numerals, means are shown for compressing air, said means being indicated generally by the reference numeral 1. The engine is shown conventionally and designated as 2, while the compressor proper is designated as 3. A conduit 4 conducts away the compressed air, and if desired a suitable storage receptacle 5 may be provided for the compressed air. This receptacle 5 may be utilized also to remove a large part of the heat of compression by radiating it to the surrounding atmosphere, or, if desired, by having a cooling liquid supplied to a surrounding jacket by suitable pipes 21 and 20. Suitable drying means may also be provided, of convenient and approved form, and I have indicated same conventionally at 6. Ingress to the drier is controlled by a valve 7 and egress therefrom by a valve 8. A suitable by-pass valve 9 is shown in the conduit 10, which conduit serves to convey the compressed air away from the storage receptacle 5. The drier 6, as previously stated, may be of any adequate and approved construction, and a carbon dioxid drier, acting to chill the air and thus reducing its vapor-bearing capacity, will usually be found suitable and adequate, although the particular form of drier used is immaterial so far as concerns many features of the invention.

According to one feature of the invention, a counter-cooler or temperature exchanging means 11 is employed to reduce the temperature of the air, and this may be done by running through one of the coils one or more of the low temperature gases obtained from the air after the conversion of its oxygen into ozone and the separation thereby of the gases. In the embodied form of apparatus, the lower portion of the conduit 10 opens into or communicates with a helically arranged pipe 12 of larger bore. Within this pipe 12 is arranged another helically arranged pipe 13 to which is supplied through a pipe 14, nitrogen or other liquid or gas at exceedingly low temperatures, as will be hereinafter described more in detail. In the illustrated apparatus, the now cooled and dry air, still under pressure, emerges from the counter-cooler 11 into the conduit 15. As embodied, the air pressure may be reduced to atmospheric pressure or but little above atmospheric pressure, and is carried through the ozonizer or separating device. The various compressing drying and cooling agencies or instrumentalities will be so arranged and regulated that the air will be delivered to the ozonizer thoroughly dry and at sufficient pressure to carry it through the ozonizer, and it will be at a temperature below the liquefying temperature of ozone and above the liquefying temperature of oxygen and nitrogen.

In the embodied form of apparatus the pressure reducing instrumentality which I have chosen to illustrate, comprises an expansion engine 16, the expanded air, much reduced in temperature by its expansion, passes through a conduit 17 into the ozonizer to have the oxygen of the air converted into ozone and liquefied. Certain of the atmospheric gases can be removed by reason of the temperature of the air being reduced below the liquefying point for such gases before the air enters the ozonizer, as for instance, carbon-dioxid. A trap 18 is shown in conduit 17, provided with a suitable drain 19, through which the liquid may be drawn off. Other means of removing gases may be provided, whereby the residual gas after the ozonizing of the oxygen may be pure or substantially pure nitrogen.

The embodied form of ozonizer comprises an outer casing 30, conveniently and preferably built in sections. Said casing is shown of general rectangular form, and having an upper section 31 into which the cold dry air from the conduit 17 is discharged and directed toward the ozonizing devices. The section 32 is shown carrying the ozonizing devices, which will be later described in detail. The two sections 31 and 32 are connected by an air-tight joint 33 which may be of suitable resilient and acid-resistant material. The section 34 of the ozonizer constitutes in the present embodiment the bottom portion into which the liquefied ozone is received, and also the other gases of the atmosphere are collected therein, and are then carried away therefrom. The parts 32 and 34 are united by a tight joint 38 which may be generally similar to 33. To more thoroughly and perfectly seal the device against air leakage, and temperature changes, an additional jacket of impervious and preferably non-conducting material 37 is placed about the joints 33 and 35. The ozonizer is of non-conducting material and construction, and may consist of inner and outer casings 35 and 36 which may be of wood, porcelain or other suitable material, and such material may have protective facings on the interior of the ozonizer wherever needed. Between said casings may be a suitable non-conducting material of any approved kind, such as felt or other non-conducting material.

The ozonizers are preferably arranged in rows or series in suitable heads or mountings 50 and 51 carried by the section 32 of the casing. One such row of ozonizers is shown in longitudinal section in Fig. 2 of the drawings, and the arrangement and construction of the ozonizers will be understood from a description of one of said ozonizers. The embodied form of ozonizer is preferably of tubular form and comprises a series of nesting, or inclosed and inclosing tubes, as will now be described in detail. For convenience in description, the tubes outside of the air passage may be termed outside tubes and those inside the air passage inside tubes. The outside tubes are shown of double form, the electrode, or current or charge carrying surface being inclosed or protected from the action of the gases, some of which might prove highly detrimental or destructive. As embodied, a cylinder of glass or other suitable dielectric material 40 is provided, and on the exterior surface thereof a coating of charge carrying material 41, such as a coating of foil or finely comminuted conducting metal held by a suitable binder and drier. The tube or cylinder 40 is inclosed by a cylinder 42, their edges abutting or joining together to hermetically seal the intervening space, and the coating 41 contained therein. The inside tubes 43, likewise of suitable dielectric material, carry on their inside a coating 44 of charge or current accumulating material, such as has already been described in connection with the outside tubes. A second inner tube 45 is likewise provided, with its edges abutting with the inside tube 43 to hermetically seal the inclosed coating 44 to protect it from the destructive action of the gases. The outer tubes are mounted in openings in the heads 50 and 51, and may be held in position by rings or gaskets 52 and 53 of resilient material which serves to hold them firmly in position and to make a tight joint. The inner tubes are supported upon holding and spacing members 54 of fiber or other suitable material, said members having their lower edges resting against the inner wall of the outside tube and receiving the lower edge of the inside tube upon shoulders formed in said members. Said members hold the respective outside and inside tubes spaced away from each other to give the requisite air passage between the inside and outside tubes. The outer coatings 41 are connected by a wire 55 to a trunk or bus wire 56. The inner coatings are connected by a wire 57 to the trunk or bus wire 58. These wires 56 and 58 are shown leading to a transformer 59, which is supplied from a suitable source of energy. Means are provided for directing or causing the air to pass between the inside and outside tubes of the various ozonizers, and for this purpose, in the illustrated embodiment, the inner tubes are closed, respectively, by disks 60.

Briefly describing the various steps to include the ozonizing of the oxygen, the compresser 1 compresses the air, which is conveyed by the conduit 4 to the storage tank 5, where it receives its preliminary cooling. The now partially cooled air passes along the conduit 10 and through the drier 6 where its moisture is extracted. It then passes through the counter-cooler 11 where its temperature is greatly reduced, and then through conduit 15 passes on to the expanding means such as the engine 16. It is here expanded to substantially atmospheric pressure again and is consequently greatly reduced in temperature, and is brought to a predetermined temperature, or approximately so, which temperature is below the liquefaction point of ozone and above the liquefaction point of oxygen and of nitrogen. The air passes through the conduit 17 into the upper portion of the ozonizer 30, as indicated by the small arrows in Fig. 2. The air then passes through the ozonizers where the oxygen is converted into ozone and the ozone is changed into liquid form.

It will be understood with reference to the ozonizers that the coatings 41 and 44 are under a high difference of potential, and there is consequently an electrical effluence between the opposite surfaces of the dielectrics, that is, the walls of the inside and outside tubes, and across the passage through which the air flows as indicated by the small arrows in Fig. 2. By reason of the temperature, the ozone, when formed by the action of the electrical effluence on the oxygen of the air, is changed into liquid form, as already described.

The liquefied ozone is collected and carried away, and the nitrogen and certain other gases of the air, being still in gaseous form, are gathered and conveyed away. In the present apparatus there is provided at the upper end of the part 34 of the ozonizer 30 a pan or receptacle 65 of vitreous or other acid-resistant material in which the liquid ozone (indicated by $x$ in Fig. 2) is gathered. The liquid ozone is conveyed away through a pipe 66, which pipe may be trapped as shown at 67, to a chamber 68 in the lower part of 34. This chamber will likewise be lined with vitreous or other acid-resistant material. Should there be any gasifying of the ozone in the chamber 68, it may be conveyed away through the pipe 70, and thereby avoid back pressure in the chamber 68 and possibly interference with the working of the process. The nitrogen and certain other gases are separated or conveyed away from the receptacle 65 through a pipe 71. The pipe 71 is shown extending into a coil 72 occupying a large portion of the chamber 68, and acting to keep the liquid ozone in said chamber cool. The coil 72 communicates with a pipe 73 for conveying away the cold gases. In the illustrated manner of carrying out the process, these gases are used in the counter-cooler 11, and for this purpose the pipe 73 communicates with the pipe 14. The nitrogen and other separated gases may be disposed of in any suitable or desirable manner, and in the illustrated apparatus a collecting chamber 74 is provided from which the gases may be drawn as desired, exit of the gas being controlled by a valve 75. Should it be desirable to remove certain or any of the gases constituting the air prior to the ozonizing of the oxygen, this may be done in any suitable manner as found convenient or expedient.

It will be understood from the foregoing that the gases of the air have been separated from each other by liquefying one gas and retaining another in gaseous form, and separating said gas and liquid. Further, it will be understood that with respect to the liquefied gas its change to the liquid state has been effected by electrical action, and more particularly by electrical effluence. Also, it will be noted that one of the gases of the air was subjected to a change in its molecular constitution, that is, the atomicity of its molecule was changed, and in the particular instance this occurred in the case of the liquefied gas; also, a great change in the temperature of liquefaction was effected by the change in the molecular constitution of the gas, that is, by the change from oxygen ($O_2$) to ozone ($O_3$).

Other advantages will be obvious from this specification, and it will be understood that variations may be made from the steps and apparatus shown and described within the scope of the accompanying claims.

What I do claim as my invention and desire to secure by Letters Patent, is:

1. The process of producing liquid ozone and separating air gases which comprises reducing air to a temperature somewhat below the liquefying point for ozone, but above the liquefying point for oxygen and nitrogen, and at such temperature subjecting the oxygen of the air to the action of ozonizing means, and separately collecting the liquid ozone and the remaining gases of the air.

2. The process of producing liquid ozone and separating air gases which comprises reducing air to a temperature below the liquefying point for ozone but above the liquefying point for oxygen and nitrogen, and at such temperature subjecting the oxygen of the air to the action of electrical effluence to change said oxygen to liquid ozone, and separately collecting the liquid ozone and the remaining gases of the air.

3. The process of producing liquid ozone and separating air gases which comprises reducing air to a temperature below the liquefying point for ozone preliminary to ozonizing said air, and at such temperature flowing said air into an ozonizing device and subjecting the oxygen of the air to the action of electrical effluence to change said oxygen to liquid ozone, and separately collecting the liquid ozone and remaining gases of the air.

4. The process of producing liquid ozone and separating air gases which comprises reducing air to a temperature below the liquefying point for ozone but above the liquefying point for oxygen and nitrogen, and at such temperature subjecting the oxygen of the air to the action of the ozonizing means and separately collecting the liquid ozone and the residual gases of the air.

5. The process of producing liquid ozone and separating air gases which comprises reducing air to a temperature below the liquefying point of ozone, causing said air to flow along in a current and subjecting said air current to an electrical effluence across the path of said current to convert the oxygen of the air into ozone, the ozone then becoming liquefied by reason of the temperature, and separately collecting the liquid ozone and remaining gases of the air.

6. The process of producing liquid ozone and separating air gases which comprises reducing air to a temperature below the liquefying point for ozone, causing said air to travel in a plurality of separate currents, and subjecting each of said air currents to an electrical effluence whereby the oxygen of the air is converted into ozone and the ozone is changed to the liquid state, and separately collecting the liquid ozone and remaining gases of the air.

7. The process of producing liquid ozone and separating atmospheric gases which comprises reducing air to a temperature below the liquefying point for ozone, causing said air to travel in a plurality of separate currents, and subjecting each of said air currents to an electrical effluence whereby the oxygen of the air is converted into ozone and the ozone is changed to the liquid state, and collecting said liquefied ozone, and separately collecting the remaining atmospheric gases.

8. The process of producing liquid ozone and separating gases which comprises reducing air to a temperature below the liquefying point for ozone, but above the liquefying point for oxygen and nitrogen, and at such temperature subjecting the oxygen of the air to the action of the ozonizing means, separately collecting said liquid ozone and the remaining air gases, and keeping said liquid ozone cool by means of the residual gases after the ozonizing of the oxygen of the air.

9. The process of producing liquid ozone and separating gases which comprises reducing air to a temperature below the liquefying point for ozone, causing said air to travel in a plurality of separate currents, and subjecting each of said air currents to an electrical effluence, whereby the oxygen of the air is converted into ozone and the ozone is changed to the liquid state, separately collecting said liquid ozone and the remaining air gases, and keeping said liquid ozone cool by means of the residual gases after the ozonizing of the oxygen of the air.

10. The process of producing liquid ozone and separating gases which comprises reducing air to a temperature below the liquefying point for ozone, but above the liquefying point for oxygen and nitrogen, and at such temperature subjecting the oxygen of the air to the action of ozonizing means, separately collecting the liquid ozone and the residual air gases, and cooling the air before it is ozonized by means of said residual cold gases.

11. The process of producing liquid ozone and separating gases which comprises reducing air to a temperature below the liquefying point for ozone, causing said air to travel in a plurality of separate currents, and subjecting each of said air currents to an electrical effluence, whereby the oxygen of the air is converted into ozone and the ozone is changed to the liquid state, separately collecting the liquid ozone and the residual air gases, and cooling the air before it is ozonized by means of said residual cold gases.

12. The process of producing liquid ozone and separating gases which comprises drying and reducing air to a temperature below the liquefying point for ozone but above the liquefying point for oxygen and nitrogen, and at such temperature subjecting the oxygen of the air to the action of ozonizing means, and separately collecting the liquid ozone and remaining gases of the air.

13. The process of producing liquid ozone and separating gases which comprises drying and reducing air to a temperature below the liquefying point for ozone, causing said air to travel in a plurality of separate currents, and subjecting each of said air currents to an electrical effluence whereby the oxygen of the air is converted into ozone and the ozone is changed to the liquid state, and separately collecting the liquid ozone and remaining gases of the air.

14. The rocess of producing liquid ozone and separating gases which comprises compressing air, cooling said compressed air, lowering the temperature of said compressed air below the liquefying temperature of ozone by expansion of said air against resistance, subjecting said air to an electrical effluence whereby the oxygen of the air is converted into ozone and the ozone liquefied, and separately collecting the liquid ozone and remaining gases of the air.

15. The process of producing liquid ozone and separating gases which comprises compressing air, cooling said compressed air, lowering the temperature of said compressed air below the liquefying temperature of ozone by expansion of said air against resistance, but maintaining the temperature of the air well above the liquefying temperature of oxygen, subjecting said air to an electrical effluence whereby the oxygen of the air is converted into ozone and the ozone liquefied, separately collecting the liquid ozone and the residual air gases, and cooling the air before it is ozonized by the residual gases remaining after the separation of the ozone.

16. The process of producing liquid ozone and separating gases which comprises compressing air, cooling said compressed air, removing the moisture therefrom, lowering the temperature of said compressed air below the liquefying temperature of ozone by expansion of said air against resistance, but maintaining the temperature of the air well above the liquefying temperature of oxygen, subjecting said air to an electrical effluence whereby the oxygen of the air is converted into ozone and the ozone liquefied, and separately collecting the liquid ozone and remaining gases of the air.

17. The process of producing liquid ozone which comprises reducing the temperature of an oxygenous gas somewhat below the liquefying point for ozone but above the liquefying point for oxygen preliminary to ozonizing it and flowing said gas at such reduced temperature into an ozonizing device and subjecting it to electrical action to change the gaseous oxygen into liquid ozone.

18. The process of producing liquid ozone which comprises reducing the temperature of an oxygenous gas somewhat below the liquefying point for ozone but above the liquefying point for oxygen preliminary to ozonizing it and flowing said gas at such reduced temperature through an ozonizing device and subjecting it to electrical action to change the gaseous oxygen into liquid ozone, and collecting said liquid ozone after it has passed through said ozonizing device.

19. The process of producing liquid ozone which comprises reducing the temperature of an oxygenous gas somewhat below the liquefying point for ozone but well above that for oxygen and at such temperature subjecting a flowing stream of said gas to the action of electrical effluence to produce ozone in liquid form.

20. The process of producing liquid ozone which comprises reducing the temperature of a flowing stream of an oxygenous gas somewhat below the liquefying point for ozone but well above that for oxygen and at such temperature subjecting a flowing stream of said gas to the action of electrical effluence to produce ozone in liquid form.

In testimony whereof, I have signed my name to this specification, in the presence of two subscribing witnesses.

HORACE DUMARS.

Witnesses:
JOHN D. MORGAN,
ROSE MENK.

---

Copies of this patent may be obtained for five cents each, by addressing the "Commissioner of Patents, Washington, D. C."